(12) United States Patent
Tilwani et al.

(10) Patent No.: US 8,904,245 B2
(45) Date of Patent: Dec. 2, 2014

(54) USING A VARIABLE TIMER FOR SENDING AN ERROR INDICATION

(75) Inventors: Narendra Tilwani, Addison, TX (US); Sairamesh Nammi, Richardson, TX (US)

(73) Assignee: Apple Inc., Cupertino, CA (US)

( * ) Notice: Subject to any disclaimer, the term of this patent is extended or adjusted under 35 U.S.C. 154(b) by 209 days.

(21) Appl. No.: 13/266,053

(22) PCT Filed: May 4, 2010

(86) PCT No.: PCT/US2010/033524
§ 371 (c)(1),
(2), (4) Date: Oct. 24, 2011

(87) PCT Pub. No.: WO2010/129533
PCT Pub. Date: Nov. 11, 2010

(65) Prior Publication Data
US 2012/0047407 A1 Feb. 23, 2012

Related U.S. Application Data

(60) Provisional application No. 61/175,092, filed on May 4, 2009.

(51) Int. Cl.
*G06F 11/00* (2006.01)
*H04L 1/18* (2006.01)
(52) U.S. Cl.
CPC ............ *H04L 1/1848* (2013.01); *H04L 1/1841* (2013.01)
USPC .............................................. 714/55; 370/310

(58) Field of Classification Search
USPC ............................................................ 714/55
See application file for complete search history.

(56) References Cited

U.S. PATENT DOCUMENTS

| | | | | |
|---|---|---|---|---|
| 5,721,733 | A * | 2/1998 | Wang et al. | 370/332 |
| 6,005,853 | A * | 12/1999 | Wang et al. | 370/332 |
| 7,127,654 | B2 * | 10/2006 | Jalali et al. | 714/748 |
| 7,411,903 | B2 * | 8/2008 | Jang et al. | 370/230 |
| 7,839,813 | B2 * | 11/2010 | Kim et al. | 370/322 |

(Continued)

FOREIGN PATENT DOCUMENTS

| | | |
|---|---|---|
| CN | 1385021 | 12/2002 |
| CN | 1429441 | 7/2003 |

(Continued)

OTHER PUBLICATIONS

International Search Report in related Application No. PCT/US2010/033524, Dec. 17, 2010, pp. 1-2.

(Continued)

*Primary Examiner* — Kamini Patel
(74) *Attorney, Agent, or Firm* — Meyertons, Hood, Kivlin, Kowert & Goetzel, P.C.

(57) ABSTRACT

Upon receiving a particular data unit by a receiving layer of a wireless device, it is detected that a previous data unit earlier in sequence to the particular data unit has not yet been received by the receiving layer. A timer is started in response to the detecting, where the timer has a time-out period that is variable dependent upon a parameter associated with receipt of the particular data unit. Upon expiration of the timer based on the timeout period, the receiving layer generates an error indication.

17 Claims, 5 Drawing Sheets

(56) References Cited

U.S. PATENT DOCUMENTS

| | | | |
|---|---|---|---|
| 8,098,664 B2 * | 1/2012 | Umesh et al. | 370/394 |
| 8,180,917 B1 * | 5/2012 | Yan et al. | 709/234 |
| 8,184,561 B2 * | 5/2012 | Maheshwari et al. | 370/310 |
| 8,208,489 B2 * | 6/2012 | Hong et al. | 370/468 |
| 2002/0191544 A1 | 12/2002 | Cheng et al. | |
| 2003/0210669 A1 | 11/2003 | Vayanos et al. | |
| 2006/0013257 A1 * | 1/2006 | Vayanos | 370/473 |
| 2006/0062223 A1 * | 3/2006 | Manuel et al. | 370/394 |
| 2006/0092973 A1 * | 5/2006 | Petrovic et al. | 370/469 |
| 2008/0107053 A1 * | 5/2008 | Kim et al. | 370/310 |
| 2008/0209297 A1 * | 8/2008 | Chandra et al. | 714/748 |

FOREIGN PATENT DOCUMENTS

| | | |
|---|---|---|
| EP | 1326388 | 9/2003 |
| EP | 1617584 | 1/2006 |
| JP | 2005295558 | 10/2005 |
| JP | 2009084919 | 4/2009 |
| KR | 10-2004-0067657 A | 7/2004 |
| RU | 2210868 | 8/2003 |
| RU | 2251219 | 4/2005 |
| WO | 2005048503 | 5/2005 |
| WO | 2007/050231 A2 | 5/2007 |
| WO | 2007079085 | 7/2007 |
| WO | 2008074771 | 6/2008 |

OTHER PUBLICATIONS

Office Action from Chinese Application No. 201080028796.1, mailed Feb. 8, 2014, English and Chinese versions, pp. 1-118.

Decision on Grant of a Patent for Invention for Application No. 2011144162, dated Jan. 4, 2014, Apple Inc., pp. 1-17.

Office Action from Japanese Patent Application No. 2012-509896, mailed Apr. 10, 2014, English and Japanese versions, pp. 1-17.

* cited by examiner

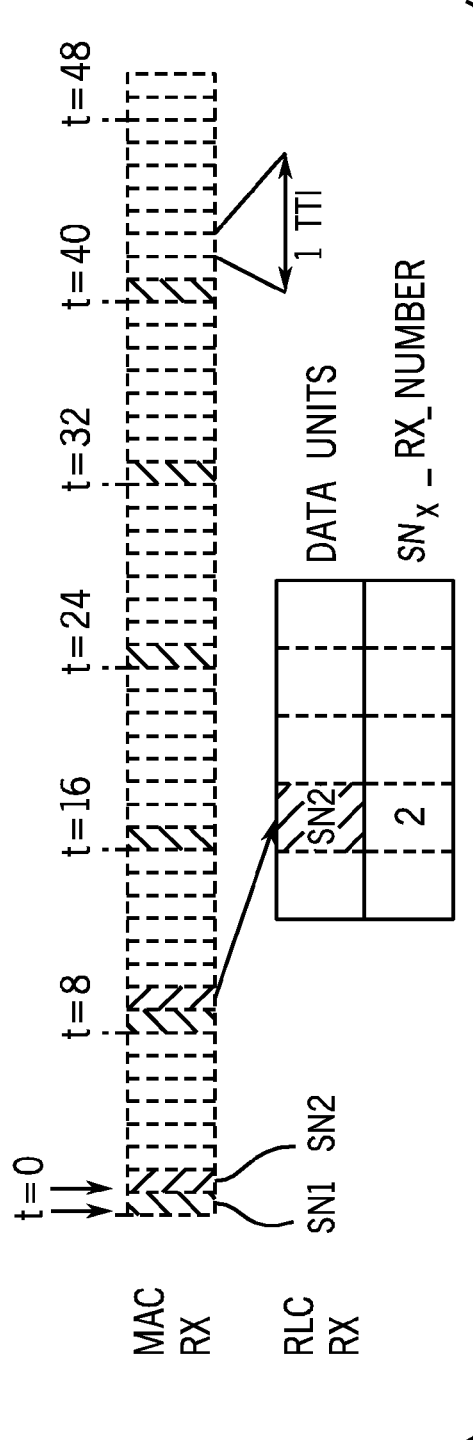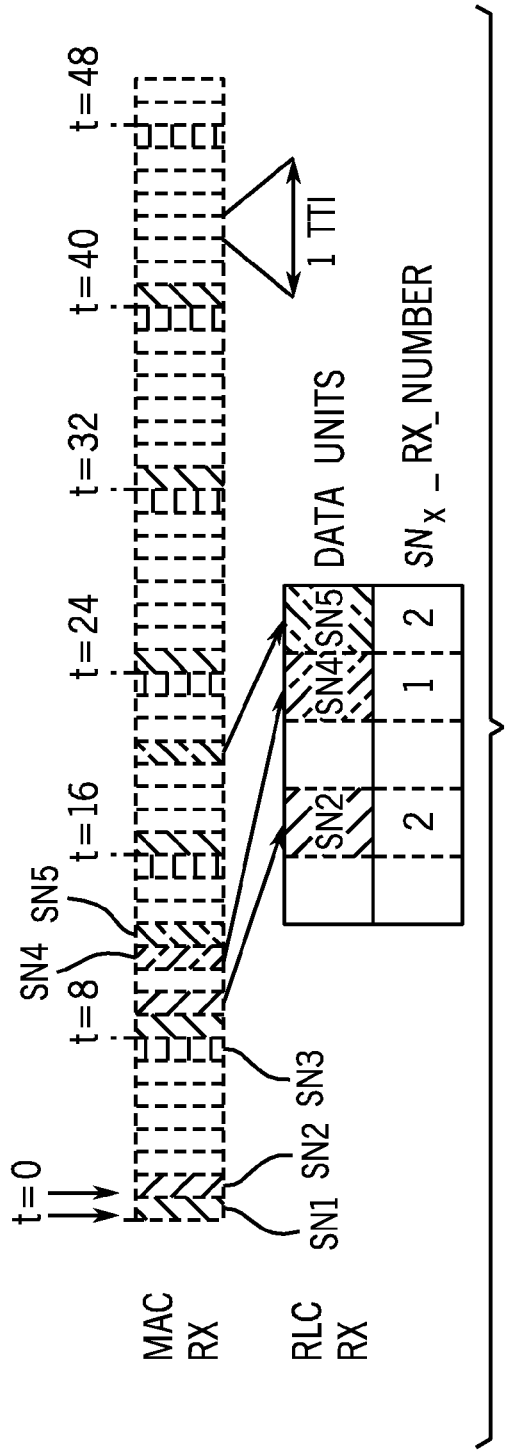

USING A VARIABLE TIMER FOR SENDING AN ERROR INDICATION

CROSS-REFERENCE TO RELATED APPLICATIONS

This application is a Submission Under 35 U.S.C. §371 for U.S. National Stage Patent Application of International Application Number: PCT/US2010/033524, filed May 10, 2010 entitled "USING A VARIABLE TIMER FOR SENDING AN ERROR INDICATION," which claims priority to U.S. Provisional Application Ser. No. 61/175,092, filed May 4, 2009, the entirety of both which are incorporated herein by reference.

BACKGROUND

Various wireless access technologies have been proposed or implemented to enable mobile stations to perform communications with other mobile stations or with wired terminals coupled to wired networks. Examples of wireless access technologies include GSM (Global System for Mobile communications) and UMTS (Universal Mobile Telecommunications System) technologies, defined by the Third Generation Partnership Project (3GPP); and CDMA 2000 (Code Division Multiple Access 2000) technologies, defined by 3GPP2. CDMA 2000 defines one type of packet-switched wireless access network, referred to as the HRPD (High Rate Packet Data) wireless access network.

Other more recent standards that provides packet-switched wireless access networks include the following, as examples: 802.16 (WiMAX) standard from the IEEE (Institute of Electrical and Electronics Engineers); and the Long Term Evolution (LTE) standard from 3GPP, which seeks to enhance the UMTS technology. The LTE standard is also referred to as the EUTRA (Evolved Universal Terrestrial Radio Access) standard.

SUMMARY

In general, according to some embodiments, a receiving layer of a wireless device receives a particular data unit. The receiving layer detects that a previous data unit earlier in sequence to the particular data unit has not yet been received. In response to the detecting, a timer is started, where the timer has a timeout period that is variable dependent upon a parameter associated with receipt of the particular data unit. Upon expiration of the timer based on the timeout period, the receiving layer generates an error indication.

Other or alternative features will become apparent from the following description, from the drawings, and from the claims.

BRIEF DESCRIPTION OF THE DRAWINGS

Some embodiments are described with respect to the following figures:

FIGS. 3A-3B schematically illustrate receipt of data units by receiving layers in a wireless device using a dynamic timer according to some embodiments;

DETAILED DESCRIPTION

Figure 1:
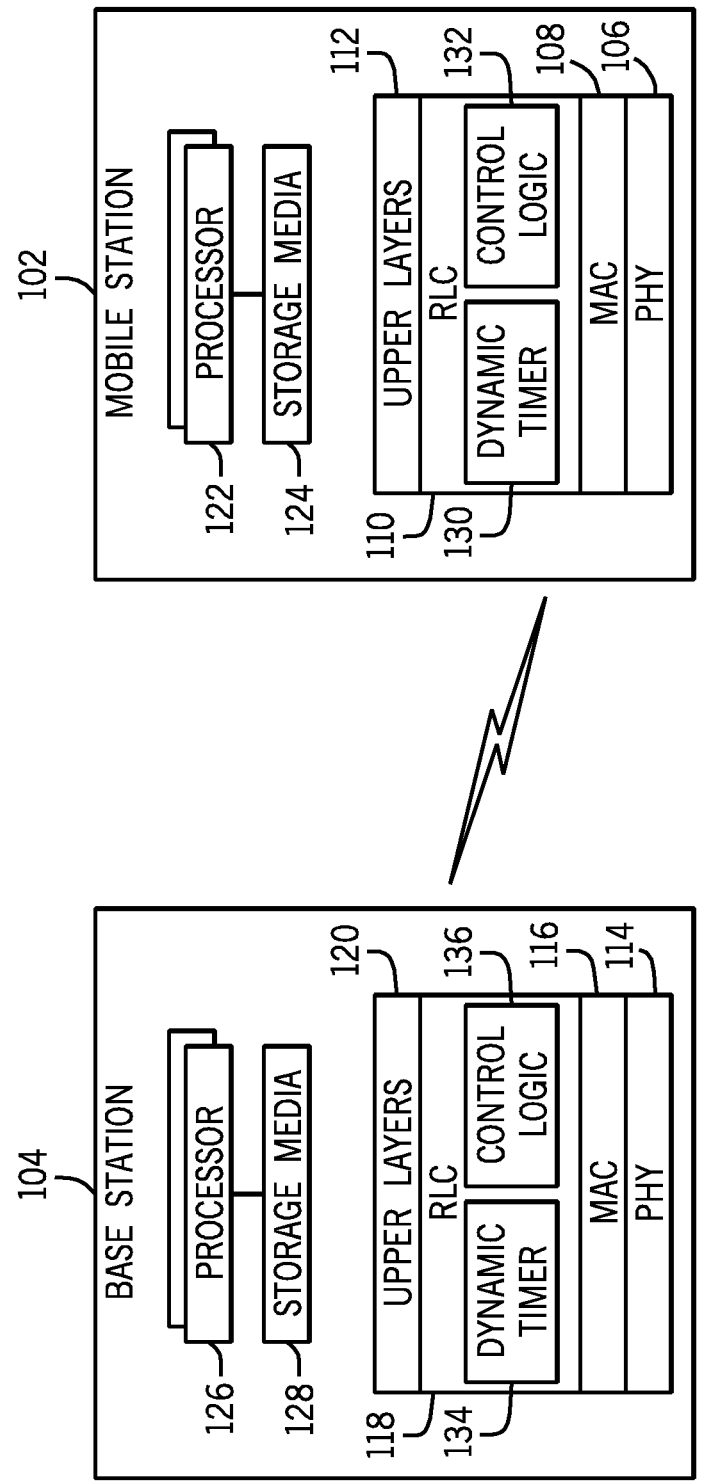
FIG. 1 is a block diagram of an example of wireless devices that incorporate some embodiments of the invention.

In wireless devices that are able to communicate with each other over a wireless access network, various layers are defined to implement various protocols associated with the wireless communications. As shown in FIG. 1, for example, the wireless devices include a mobile station 102 and a base station 104. Examples of the mobile station 102 include a mobile telephone, a personal digital assistant (PDA), a portable computer, an embedded device such as a health monitor, attack alarm, or other devices. The base station 104 can be any type of device connected to the wireless access network for wirelessly communicating with the mobile station. For example, the base station 104 can include a cellular network base station, an access point used in any type of wireless network, or any other type of wireless transmitter/receiver. The term "base station" can also encompass an associated controller, such as a base station controller or a radio network controller. The term "base station" also refers to a femto base station or access point, a micro base station or access point, or a pico base station or access point. In a more specific example, the base station can be part of an EUTRA (Evolved Universal Terrestrial Radio Access) access network, or other type of wireless network.

In the example depicted in FIG. 1, the various protocol layers of the mobile station 102 include a physical layer 106, an MAC (medium access control) layer 108, an RLC (radio link control) layer 110, and upper layers 112. The physical layer 106 is used to implement the physical interfacing over the wireless link with the base station 104. The MAC layer 108 provides addressing and channel access control mechanisms. The RLC layer 110 is responsible for error recovery and flow control over the wireless link. The upper layers 112 implement other protocols that are used for wireless communications between the mobile station 102 and the base station 104. The upper layers 112 can also include application software.

The base station 104 similarly includes a physical layer 114, an MAC layer 116, an RLC layer 118, and upper layers 120.

The mobile station 102 further includes one or multiple processors 122, which is (are) connected to storage media 124. Similarly, the base station 104 includes one or multiple processors 126, which is (are) connected to storage media 128. The storage media 124 or 128 can be implemented with disk-based storage media and/or integrated circuit or semiconductor storage media.

The RLC layer 110 or 118 can be configured to perform data transfer in various modes, including a transparent mode, unacknowledged mode, or acknowledged mode. In acknowledged mode, the receiving RLC layer can provide status control packets back to the transmitting RLC layer to indicate that errors have occurred in the receipt of packets over the wireless link. A "packet" is intended to refer to any data unit that can be communicated between the base station 104 and mobile station 102, where the data unit can include control information or bearer data. In this discussion, a "packet" and "data unit" are used interchangeably.

An RLC layer implementing the acknowledged mode can perform ARQ (automatic repeat request) retransmission, in which the receiving RLC layer informs the transmitting RLC layer of an error in data unit receipt. HARQ (hybrid ARQ)

differs from ARQ in that HARQ adds forward error correction (FEC) bits to data that is to be transmitted.

An issue associated with acknowledged mode operation is that there can be increased end-to-end latency in transmission of packets between the wireless devices due to ARQ retransmissions. Conventionally, a receiving RLC layer is provided with a reordering timer to allow the receiving RLC layer to wait a fixed amount of time for a missing packet before the receiving RLC layer generates a status report back to the transmitting RLC layer that a particular packet has not been received. However, because conventional reordering timers employ fixed timeout periods, performance may suffer when the reordering timer may cause the receiving RLC layer to wait too long to send a status report back to the transmitting RLC layer.

In accordance with some embodiments, as shown in FIG. 1, a dynamic reordering timer is employed. In FIG. 1, the RLC layer 110 in the mobile station 102 includes a dynamic reordering timer 130 and associated control logic 132. The RLC layer 118 in the base station 104 similarly includes a dynamic reordering timer 134 and associated control logic 136. With the dynamic reordering timer 130 or 134, the timeout period of the dynamic timer can be dynamically (variably) set such that the timeout period is made to be variable depending upon a parameter associated with receipt of a packet. In some implementations, the parameter on which the dynamic timeout period of a reordering timer is set is a parameter representing the number of transmissions of a packet before successful receipt of the packet by the RLC layer. The dynamic setting of the timeout period of a dynamic reordering timer is discussed further below.

The general operation of a reorder timer is discussed in connection with the example of FIG. 2. A transmission medium 202 is provided between a transmitter and a receiver. The transmitter (TX) is provided on one side of the transmission medium, while the receiver (RX) is provided on the other side of the transmission medium. The transmitter can be one of the mobile station 102 and base station 104, while the receiver can be the other one of the mobile station 102 and the base station 104. The transmitter includes a transmitting RLC layer (RLC TX) and a transmitting MAC layer (MAC TX), while the receiver includes a receiving MAC layer (MAC RX) and a receiving RLC layer (RLC RX).

Figure 2:
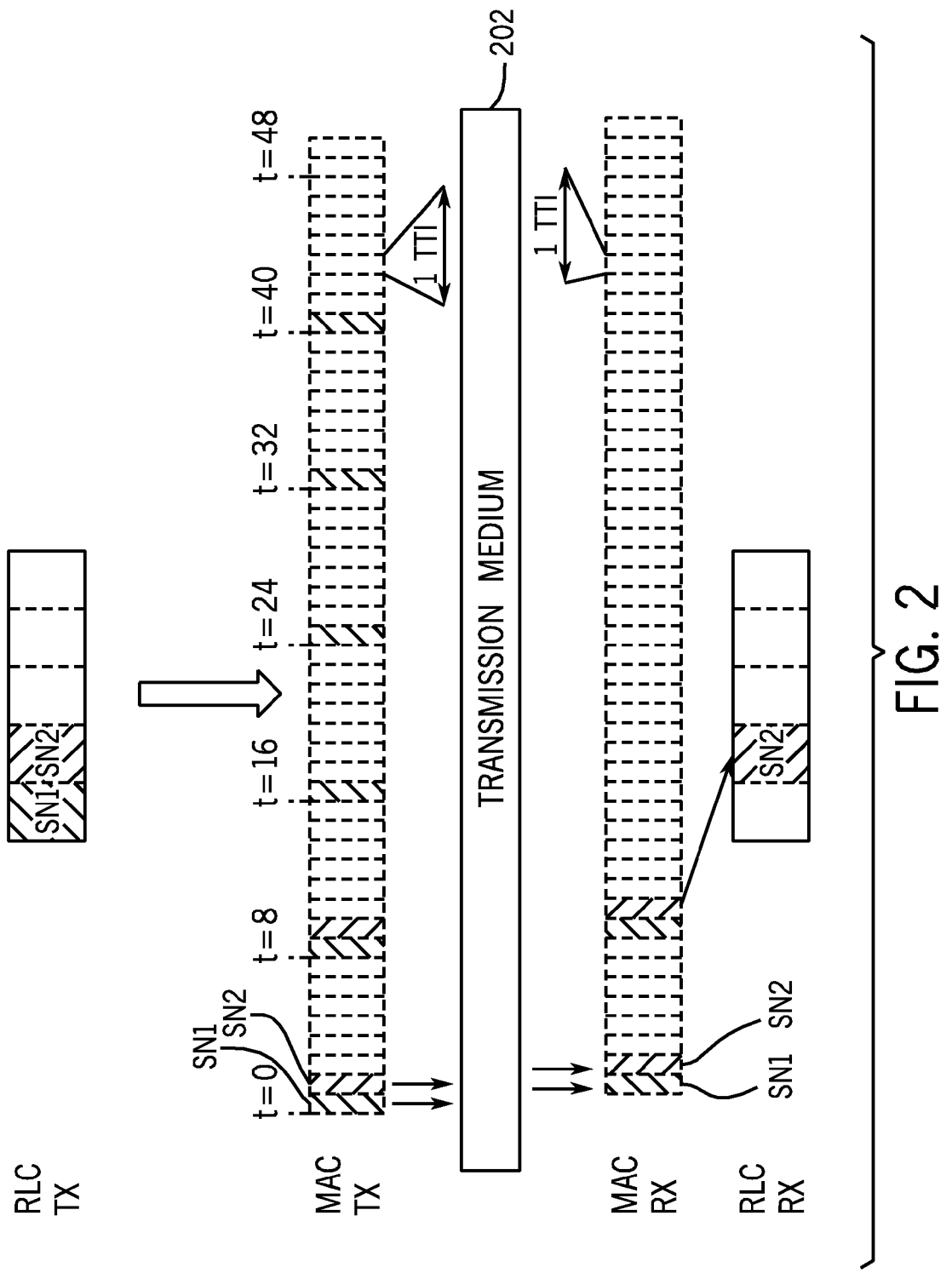
FIG. 2 schematically illustrates transmission of data units between a transmitter and a receiver over a transmission medium.

In the example of FIG. 2, the transmitting RLC layer transmits packets SN1 and SN2. The packets SN1 and SN2 transmitted by the transmitting RLC layer are sent through the transmitting MAC layer. In the example of FIG. 2, the transmitting MAC layer first transmits packet SN1 at transmission time interval 1 (TTI 1). The transmitting MAC layer transmits the packet SN2 at TTI 2. Note that the cross hatching patterns for SN1 and for SN2 are different for ease of understanding in FIG. 2. The packets SN1 and SN2 are transmitted over the transmission medium 202 (e.g., a wireless link between the mobile station 102 and base station 104), for receipt by the receiving MAC layer. The receiving MAC layer propagates a received packet to the receiving RLC layer.

In the example of FIG. 2, it is assumed that the receiving RLC layer did not successfully receive packets SN1 and SN2 that were transmitted at TTIs 0 and 1. Since packets SN1 and SN2 transmitted at TTIs 0 and 1 were not successfully received by the receiving RLC layer, packets SN1 and SN2 are retransmitted at TTIs 8 and 9, respectively. In the example of FIG. 2, it is assumed that the packet SN2 transmitted at TTI 9 was successfully received at the receiving RLC layer. However, although packet SN2 was received, the previous packet (SN1 that is earlier in sequence than SN2) has not yet been received by the receiving RLC layer. Upon detection of the out-of-sequence delivery, the reordering timer is started at TTI 9. However, conventionally, the timeout period of this reordering timer is static and is determined as follows:

$$\text{Reorder Timer} = K * \text{Maximum Number of HARQ Transmissions,} \quad \text{(Eq. 1)}$$

where K is the number of HARQ processes supported by the MAC layer, and Maximum Number of HARQ Transmissions represents the maximum number of transmissions that can be performed by the HARQ mechanism. Assuming K=8, and the Maximum Number of HARQ Transmissions is equal to 6, then the static timeout period for the reordering timer is set at 48 TTIs. With the conventional static setting of the reordering timer, if the packet SN1 is not received correctly after all further retransmissions from the transmitting MAC layer (at TTI 16, TTI 24, TTI 32, and TTI 40 in the example of FIG. 2), then the reordering timer would expire at TTI 57, computed as TTI 9+TTI 48=TTI 57. However, note that when using the conventional static reordering timer, the latency in sending an error report upon expiration of the reordering timer at TTI 57 can be relatively large (in other words, there can be a relatively large delay in sending the error report due to failure in receiving a packet).

In the example of FIG. 2, although the last retransmission of SN1 was at TTI 40, the status report was not sent back from the receiving RLC layer to the transmitting RLC layer until TTI 57, a delay of 17 TTIs.

In accordance with some embodiments, instead of using a static reordering timer that is set with a static timeout period, a dynamic reordering timer having dynamically settable timeout periods is employed. Effectively, the timeout period of a reordering timer can be dynamically adjusted based on predetermined condition(s) to reduce reporting latency in case of error in receiving a packet. In some implementations, this predetermined condition is represented by a parameter that corresponds to a number of HARQ transmissions at the MAC layer of a packet before successful receipt by a receiving RLC layer.

Generally, if an RLC packet $SN_x$ is received with N transmissions (N≥1), any previous packet $SN_{x-1}$, that is not yet received must have undergone at least N transmissions. This statement is true for any system that uses synchronous transmission at the MAC layer. For example, consider the case of FIG. 2, where the transmission of packet SN1 started in TTI 0. The earliest that SN2 can be transmitted is TTI 1. The transmission of SN2 can be delayed where it may start in TTI 10, for example. In that case, while SN2 is completing its first transmission, SN1 would have completed its second transmission. Hence, it is certain that SN1 has completed at least as many transmissions as SN2.

However, the algorithm according to some embodiments is not limited to just synchronous systems. The principle can also be applied to systems using asynchronous HARQ, where packet retransmissions are scheduled in a first in first out (FIFO) basis.

To dynamically adjust the timeout period of the reordering timer (130 or 134 in FIG. 1), the MAC layer provides a value, $SN_x\_RX\_Number$, which indicates the number of HARQ transmissions taken by a packet for successful reception of the packet. The $SN_x\_RX\_Number$ is reported to the RLC layer. The RLC layer then dynamically computes the dynamic timeout period is as follows:

$$\text{Reorder Timer} = K * (\text{Maximum Number of HARQ Transmissions} - SN_x\_RX\_\text{Number}) \quad \text{(Eq. 2)}$$

The number of bits used to represent $SN_x\_RX\_Number$ is based on the maximum possible number of HARQ transmissions. Thus, for example, if the maximum number of HARQ transmissions is 8, then the number of bits used to represent $SN_x\_RX\_Number$ would be 3. More generally, the number of bits used to represent $SN_x\_RX\_Number$ is calculated as $\log_2$ (Maximum Number of HARQ Transmissions).

An explanation regarding the operation of the dynamic reordering timer (130 or 134) is explained in connection with FIG. 3A. FIG. 3A shows receipt of SN1 and SN2 packets at the receiving MAC layer. As with the example of FIG. 2, in response to the packet SN2 retransmitted at TTI 9, the receiving MAC layer successfully received packet SN2, without receiving packet SN1. Packet SN2 was successfully sent by the MAC layer to receiving RLC layer upon the second transmission that corresponds to TTI 9. In the example of FIG. 3A, in response to successful receipt of packet SN2 by the receiving MAC layer due to the second transmission, the receiving MAC layer sets $SN_x\_RX\_Number$ to 2, and reports the value of $SN_x\_RX\_Number$ to the receiving RLC layer. Based on Eq. 2, the receiving RLC layer computes the dynamic reordering timeout as follows, assuming K is equal to 8 and Maximum Number of HARQ Transmissions is 6:

Reorder Timer=8*(6−2)=32 TTIs.

The reordering timer is started at TTI 9 (upon receipt of the packet SN2 by the receiving RLC layer. If the packet SN1 is not received correctly after all transmissions, the dynamic reordering timer will expire at TTI 9+TTI 32=TTI 41, since the last transmission of SN1 is at TTI 40. When the reordering timer expires at TTI 41, the receiving RLC layer can immediately trigger the error report that is sent back to the transmitting RLC layer, where the error report indicates that packet SN1 has not been successfully received.

With the example given in FIG. 3A, it can be seen that the status report is sent back to the transmitting RLC layer with smaller latency than with the static reordering timer technique.

Another example is shown in FIG. 3B, where multiple gaps occur in receipt of packets (a gap for missing packet SN1 before SN2, and a gap for missing packet SN3 between SN2 and SN4. Upon successful receipt of packet SN2 without receiving the previous packet SN1, the dynamic reordering timer is started with the timeout period dynamically set as discussed above in connection with FIG. 3A. However, while the reordering timer for packet SN1 is active, it is possible that another gap is created, which in the example of FIG. 3B is a gap due to non-receipt of packet SN3 at the receiving RLC layer even though later packets SN4 and SN5 have been received by the receiving RLC layer. Packet SN4 was received after one transmission, while packet SN5 was received after two transmissions. Once the reordering timer for packet SN1 expires or is stopped due to successful reception of packet SN1, the receiving RLC layer moves the receive window and sees another gap (in this case the gap between SN2 and SN4).

As a result, the receiving RLC layer restarts the dynamic reordering timer, with the receiving RLC layer computing the dynamic timeout period using Eq. 2, as follows:

Reorder Timer=8*(6−2)=32 TTIs.

In this case, the $SN_x\_RX\_Number$ of the last successfully received packet is used, in this case packet SN5. Assuming that the SN1 gap timer expired at TTI 41, and the timer for the SN3 gap is started at TTI 41, if the SN3 packet is not received correctly after all transmissions, then the reordering timer for the SN3 gap would expire at TTI 41+TTI 32=TTI 73. The last transmission of packet SN3 is at TTI 47—hence, the receiving RLC layer can immediately trigger the error report at TTI 73.

Figure 4:
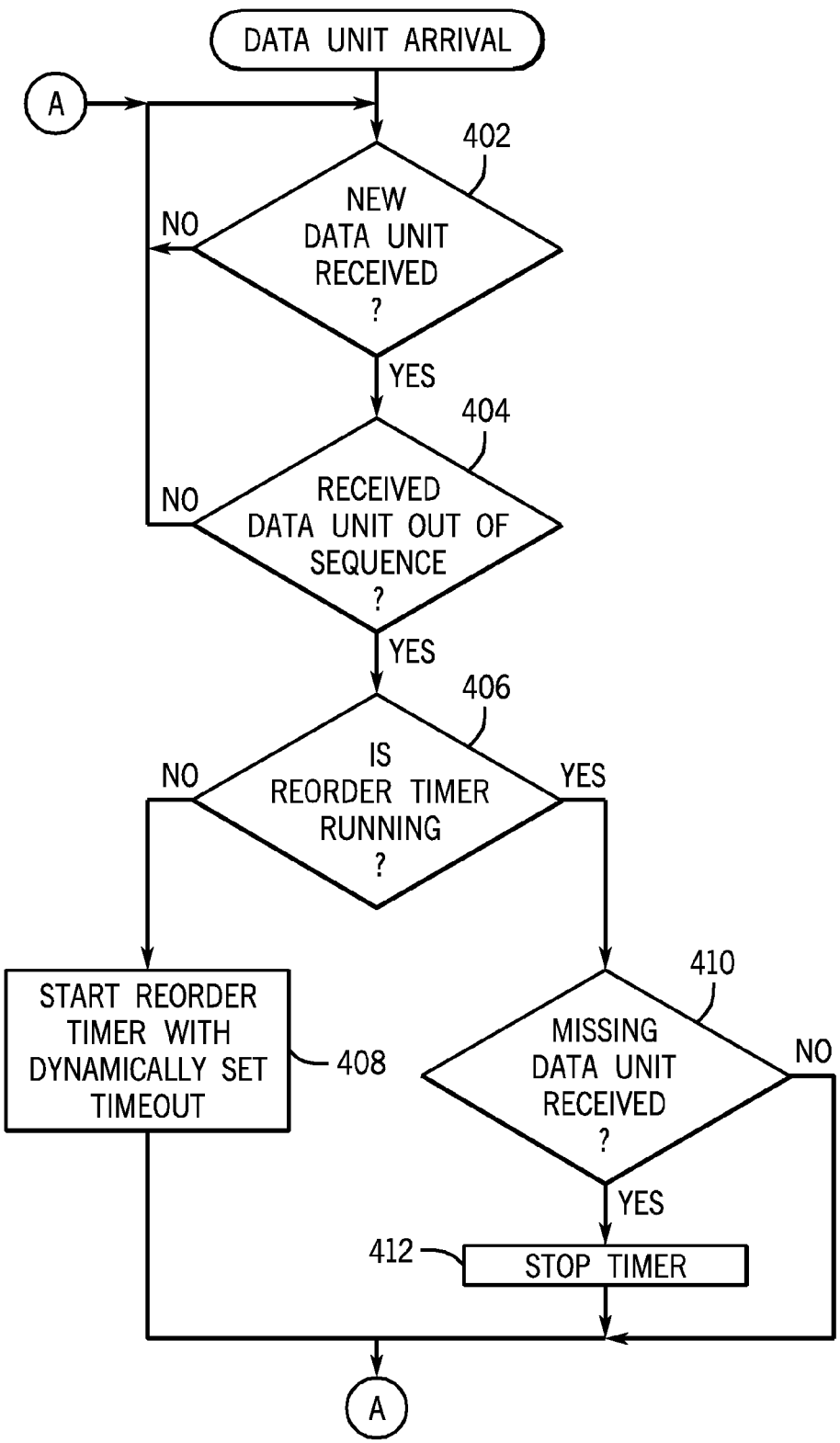
FIG. 4 is a flow diagram of a process responsive to receiving a data unit, according to some embodiments.

FIG. 4 is a flow diagram of a process performed in response to receipt of a data unit (or packet). The process of FIG. 4 can be performed by the control logic 132 or 136 of FIG. 1 (and/or by other control logic). When a new data unit is received (at 402), the receiving RLC layer determines (at 404) whether the received data unit is out of sequence (e.g., a previous data unit in a sequence has not yet been received). If the received data unit is not out of sequence, then normal processing is performed.

However, if it is determined that the received data unit is out of sequence, then the receiving RLC layer determines (at 406) if a reordering timer is already running. If not, the reordering timer is started (at 408) with a dynamically set timeout period, such as according to Eq. 2 above.

If a reordering timer is already running, as determined at 406, the receiving RLC layer determines (at 410) if a missing data unit was received. If not, the process returns. However, if the receiving RLC layer determines that a missing data unit was received, then the reordering timer is stopped (at 412).

Figure 5:
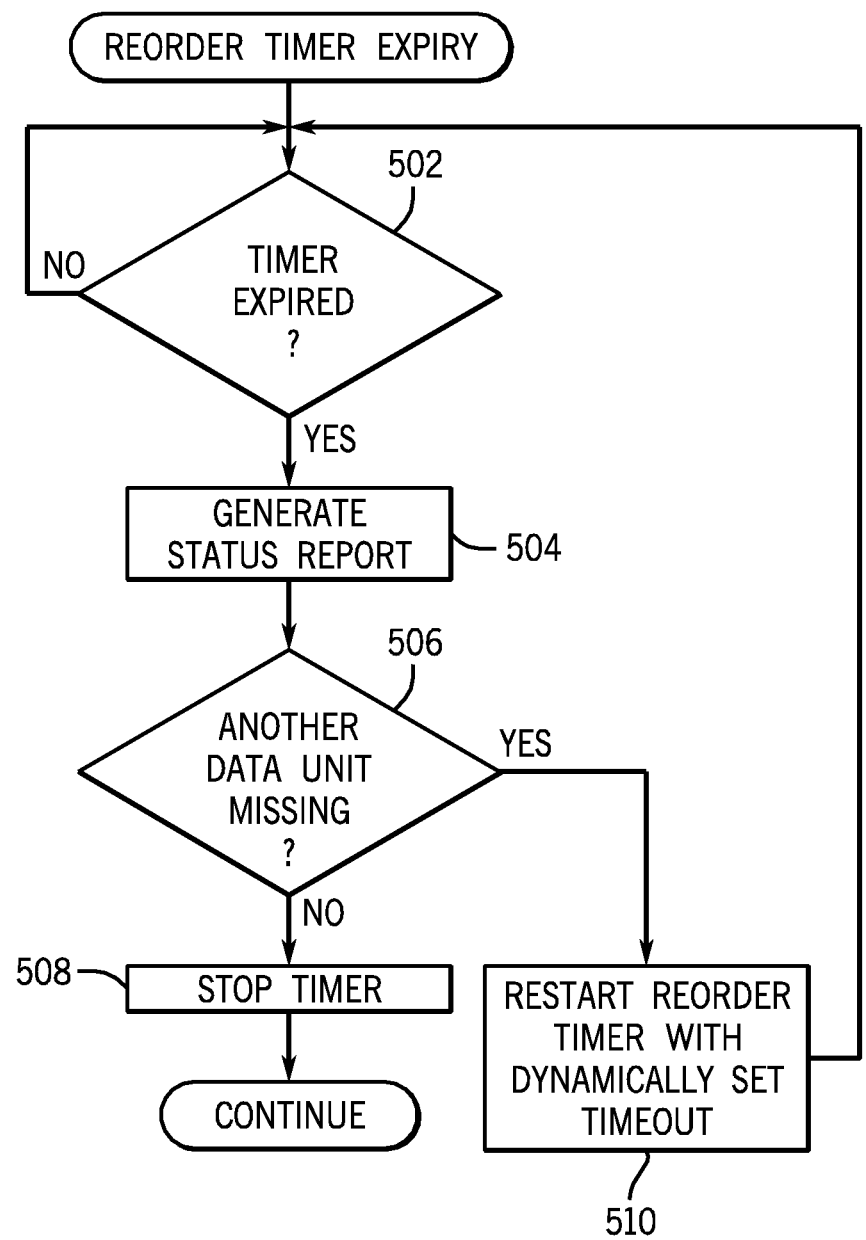
FIG. 5 is a flow diagram of a process of handling timeout of a reorder timer, according to some embodiments.

FIG. 5 is a flow diagram of a process of handling expiration of a reordering timer. Upon detection (at 502) of expiration of the reordering timer, the receiving RLC layer generates (at 504) a status report to indicate failure in receipt of a data unit. This status report is sent back to the transmitting RLC layer, over the wireless link.

The receiving RLC layer next determines (at 506) if another data unit is missing. If not, the reordering timer is stopped (at 508). However, if another data unit is missing, such as in the scenario depicted in FIG. 3B, the reordering timer is restarted (at 510) with a dynamically set timeout period, such as according to Eq. 2.

As further optimizations, it may be possible to send a status report even earlier in the case of multiple gaps, such as depicted in FIG. 3B (i.e. earlier than TTI 73 in the example). The main reason for not reporting the error earlier (i.e. earlier than TTI 73 in the example) is that the receiving RLC layer does not keep track of the arrival time of the subsequently received packets. If the arrival time could be tracked, then the overlap time between the arrival time of the subsequent successfully received packet and the reordering timer could be removed.

In some implementations, the receiving RLC layer can record the absolute time based on an internal clock of the receiving wireless device. Using the absolute time of the successfully received packets as reference, the dynamic timer can be adjusted to enable earlier failed packet detection.

In other implementations, relative offsets are used rather than absolute arrival time. One way to compute relative offsets is as follows. The receiving RLC layer can record $SN_x\_Offset\_Start$ and $SN_x\_Offset\_End$ for each gap, where $SN_x\_Offset\_Start$ is the reorder time left (amount of time left on the reordering timer) when the next gap occurred, and $SN_x\_Offset\_End$ represents the reorder time left in timer expiry.

In this case, the dynamic timeout period is given by:

Reorder Timer=[K*(Maximum Number of HARQ Transmissions−$SN_x\_RX\_Number$)−($SN_x\_Offset\_Start−SN_x\_Offset\_End$)]. (Eq. 3)

Using the example of FIG. 3, the $SN_4\_Offset\_Start$ will be 30 since packet SN4 arrives in TTI 11, and $SN_5\_Offset\_Start$ will be 21. Assume that packet SN1 never arrives, the reorder timer expires at TTI 41. Since the timer has expired, the reorder time left is 0. Hence the value for $SN_4\_Offset\_End$ and $SN_5\_Offset\_End$ is 0. Using Eq. 3, the dynamic reorder timer is computed as follows:

Reorder Timer=8*(6−2)−(21−0)=11 TTIs.

The timer for the SN3 gap is started at TTI 41, if the SN3 packet is not received correctly after all transmissions, then the reordering timer for the SN3 gap would expire at TTI 41+TTI 11=TTI 52. The last transmission of packet SN3 is at TTI 47—hence, the receiving RLC layer can immediately trigger the error report at TTI 52.

If packet SN1 had arrived at TTI 24, the reorder time left would have been 17. Hence $SN_4\_Offset\_End$ would be set to '17' and $SN_5\_Offset\_End$ would be set to '17'. Using Eq. 3, the dynamic reorder timer is computed as follows:

Reorder Timer=8*(6−2)−(21−17)=28 TTIs.

Since the SN1 packet has arrived, the dynamic timer will be restarted for the SN3 gap at TTI 24. If the SN3 packet is not received correctly after all transmissions, then the reordering timer for the SN3 gap would expire at TTI 24+TTI 28=TTI 52. The last transmission of packet SN3 is at TTI 47—hence, the receiving RLC layer can immediately trigger the error report at TTI 52.

In the example in FIGS. 3A and 3B, a simplified approach to reduce the number of stored values can be implemented in the receiving RLC layer where the receiving RLC layer would track/store the variables for only one successful received packet per gap i.e. $SN_x\_RX\_Number$, $SN_x\_Offset\_Start$, $SN_x\_Offset\_End$ or absolute time. For example the dynamic reorder timer value could be computed using SN4 or SN5. This can be highly beneficial in the multiple gap case if large number of packets are received correctly (i.e. say all SN4 to SN30 packets are received correctly) while the reorder timer is still on for a previous packet (i.e. SN1 in this case).

Instructions of various modules described above (including the RLC layer 110 or 118 or other layers of FIG. 1) are loaded for execution on a processor (122 or 126). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   receiving, at a receiving layer of a wireless device, a first particular data unit;
   detecting, by the receiving layer, that a first previous data unit earlier in sequence to the first particular data unit has not yet been received by the receiving layer;
   starting a first timer in response to the detecting, wherein the first timer has a first timeout period that is variable dependent upon a parameter associated with receipt of the first particular data unit, wherein the first timeout period is based on of a number of hybrid automatic repeat request (HARQ) processes supported by a medium access control (MAC) layer of the wireless device;
   receiving, at the receiving layer, a second particular data unit subsequent to said starting the timer;
   detecting, by the receiving layer, that a second previous data unit earlier in sequence to the second particular data unit and later in sequence to the first particular data unit has not yet been received by the receiving layer;
   determining a first time remaining in the first timeout period when the second particular data unit was received;
   starting a second timer in response to one of receiving the first pervious data unit and expiration of the first timeout period, wherein the second timer has a second timeout period, wherein the second timeout period is based on the number of HARQ processes supported by the MAC layer and an adjustment time, wherein the adjustment time is based on the first time remaining in the first timeout period, wherein, if the first previous data unit was received, then the first time remaining is reduced by a second time remaining in the first timeout period when the first previous data unit was received; and
   generating, by the receiving layer, an error indication in response to expiration of one of the first timer based on the first timeout period and the second timer based on the second timeout period.

2. The method of claim 1, further comprising:
   upon expiration of the first timer based on the first timeout period, the receiving layer sending an error indication regarding failure to receive the first previous data unit.

3. The method of claim 1, further comprising:
   dynamically setting the first timeout period of the timer based on the parameter associated with receipt of the first particular data unit.

4. The method of claim 3, wherein dynamically setting the first timeout period of the first timer comprises varying the first timeout period based on a number of transmissions associated with successful receipt of the first particular data unit, wherein the parameter associated with the receipt of the first particular data unit includes a parameter representing the number of transmissions.

5. The method of claim 4, wherein dynamically setting the first timeout period comprises setting the first timeout period based on K times a difference between a maximum number of transmissions and the number of transmissions, where K represents the number of HARQ processes supported by the MAC layer of the wireless device.

6. The method of claim 1, wherein receiving the first particular data unit by the receiving layer comprises receiving the first particular data unit by a radio link control (RLC) layer.

7. The method of claim 6, further comprising sending the error indication to a transmitting RLC layer in a transmitting wireless device.

8. The method of claim 1, wherein the wireless device is a mobile station.

9. The method of claim 1, wherein the wireless device is a base station.

10. A wireless device comprising:
a physical layer to communicate wirelessly over a wireless link; and
a receiving layer configured to:
 receive a first particular data unit;
 detect that a first previous data unit earlier in sequence to the first particular data unit has not yet been received by the receiving layer;
 start a first timer in response to the detecting, wherein the first timer has a first timeout period that is variable dependent upon a parameter associated with receipt of the particular data unit, wherein the timeout period is based on of a number of hybrid automatic repeat request (HARQ) processes supported by a medium access control (MAC) layer of the wireless device;
 receive a second particular data unit subsequent to said starting the timer;
 detect that a second previous data unit earlier in sequence to the second particular data unit and later in sequence to the first particular data unit has not yet been received by the receiving layer;
 determine a first time remaining in the first timeout period when the second particular data unit was received;
 start a second timer in response to one of receiving the first pervious data unit and expiration of the first timeout period, wherein the second timer has a second timeout period, wherein the second timeout period is based on the number of HARQ processes supported by the MAC layer and an adjustment time, wherein the adjustment time is based on the first time remaining in the first timeout period, wherein, if the first previous data unit was received, then the first time remaining is reduced by a second time remaining in the first timeout period when the first previous data unit was received; and
 generate an error indication in response to expiration of one of the first timer based on the first timeout period and the second timer based on the second timeout period.

11. The wireless device of claim 10, wherein the receiving layer is configured to further:
upon expiration of the first timer based on the first timeout period, send the error indication regarding failure to receive the first previous data unit.

12. The wireless device of claim 10, wherein the receiving layer is configured to further:
dynamically set the first timeout period of the first timer based on the parameter associated with receipt of the first particular data unit.

13. The wireless device of claim 12, wherein dynamically setting of the first timeout period of the first timer comprises varying the first timeout period based on a number of transmissions associated with successful receipt of the first particular data unit, wherein the parameter associated with the receipt of the first particular data unit includes a parameter representing the number of transmissions.

14. The wireless device of claim 10, wherein the receiving layer is a radio link control (RLC) layer.

15. The wireless device of claim 14, wherein the error indication is to be sent by the receiving layer to a transmitting RLC layer in a transmitting wireless device.

16. The wireless device of claim 10, comprising a mobile station or a base station.

17. A non-transitory computer readable medium storing program instructions, wherein the program instructions are executable to cause a processor of a wireless device to:
receive, at a receiving layer of the wireless device, a first particular data unit;
detect, by the receiving layer, that a first previous data unit earlier in sequence to the first particular data unit has not yet been received by the receiving layer;
start a first timer in response to the detecting, wherein the first timer has a first timeout period that is variable dependent upon a parameter associated with receipt of the first particular data unit, wherein the timeout period is based on of a number of hybrid automatic repeat request (HARQ) processes supported by a medium access control (MAC) layer of the wireless device;
receive, at the receiving layer, a second particular data unit subsequent to said starting the timer;
detect, by the receiving layer, that a second previous data unit earlier in sequence to the second particular data unit and later in sequence to the first particular data unit has not yet been received by the receiving layer;
determine a first time remaining in the first timeout period when the second particular data unit was received;
start a second timer in response to one of receiving the first pervious data unit and expiration of the first timeout period, wherein the second timer has a second timeout period, wherein the second timeout period is based on the number of HARQ processes supported by the MAC layer and an adjustment time, wherein the adjustment time is based on the first time remaining in the first timeout period, wherein, if the first previous data unit was received, then the first time remaining is reduced by a second time remaining in the first timeout period when the first previous data unit was received; and
generate, by the receiving layer, an error indication in response to expiration of one of the first timer based on the first timeout period and the second timer based on the second timeout period.

* * * * *

UNITED STATES PATENT AND TRADEMARK OFFICE
CERTIFICATE OF CORRECTION

| | |
|---|---|
| PATENT NO. | : 8,904,245 B2 |
| APPLICATION NO. | : 13/266053 |
| DATED | : December 2, 2014 |
| INVENTOR(S) | : Narendra Tilwani et al. |

It is certified that error appears in the above-identified patent and that said Letters Patent is hereby corrected as shown below:

In the Claims:

Claim 1, Column 8, Line 15, please delete "on of a" and substitute -- on a --

Signed and Sealed this
Ninth Day of June, 2015

Michelle K. Lee
*Director of the United States Patent and Trademark Office*